United States Patent

Turpen

[11] 3,908,461
[45] Sept. 30, 1975

[54] ADJUSTABLE PRESSURE TRANSDUCER WITH DIGITAL SIGNAL OUTPUT

[75] Inventor: Oliver S. Turpen, Redwood City, Calif.

[73] Assignee: Randtron Systems, Menlo Park, Calif.

[22] Filed: June 20, 1974

[21] Appl. No.: 481,082

[52] U.S. Cl. .................. 73/398 AR; 73/410; 338/41
[51] Int. Cl.² ............................................ G01L 9/02
[58] Field of Search .......... 73/398 AR, 410, 40.5 R; 338/41, 201, 39, 40, 42

[56] References Cited
UNITED STATES PATENTS

| | | | |
|---|---|---|---|
| 2,520,624 | 8/1950 | Davey | 73/40.5 R |
| 2,841,674 | 7/1958 | Bourns et al. | 73/398 R |
| 2,956,252 | 10/1960 | Boode et al. | 338/42 |
| 3,238,487 | 3/1966 | Le Van et al. | 73/398 R |
| 3,525,262 | 8/1970 | Goran, Jr. | 73/398 R |

Primary Examiner—Donald O. Woodiel
Attorney, Agent, or Firm—Townsend and Townsend

[57] ABSTRACT

A pressure transducer assembly for indicating ambient pressure over a predetermined differential pressure range having a minimum and a maximum and operable over a wide range of absolute pressures. A housing having an interior in fluid communication with ambient pressure surrounds a digital signal generator which is protected from ingressing contaminants. The digital signal generator includes a translatable electrical contact member secured to the working end of a surrounding electrically conductive bellows secured at the remaining end to the housing and a stationary multi-resistor assembly having a staggered pair of rows of spaced contact pads and miniature resistors coupled between selected pads in opposite rows to provide a series resistance network whose resistance depends on the position of the contact element, the pads and resistors being supported on an insulated substrate. The multi-resistor assembly is supported by a conductive rod which is translatable in opposite directions along the axis of the housing by a simple adjustment mechanism so that the fixed differential pressure operating range may be shifted over a wide range of absolute pressures.

A plurality of transducers are mounted in a sheathed telephone feed cable at regularly spaced positions therealong, with each transducer being electrically connected to a different pair of subscriber conductors so that the pressure at any given location along the feed cable can be determined by applying a test voltage across individual subscriber conductor pairs at a remote location and noting the resistance.

17 Claims, 20 Drawing Figures

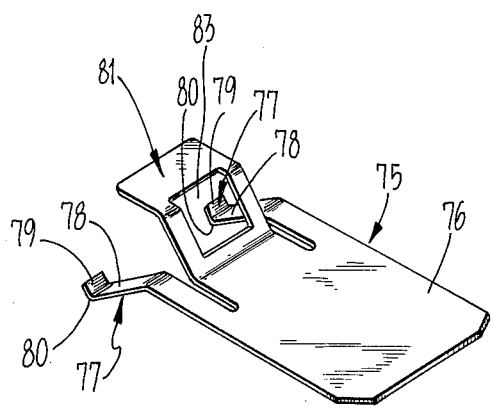
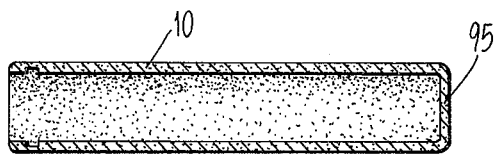
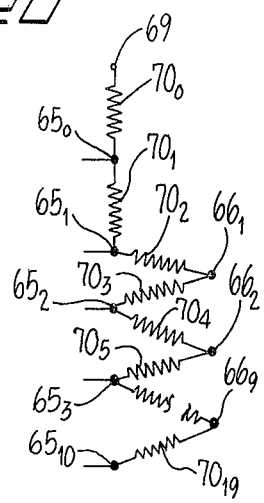
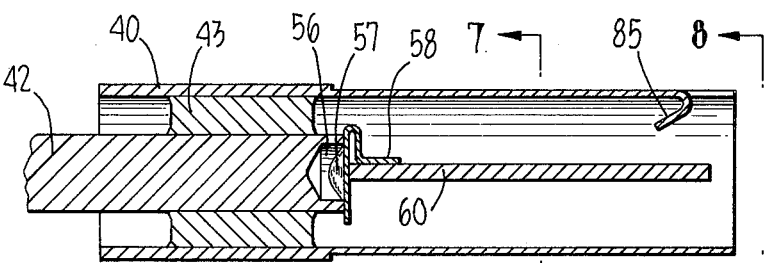
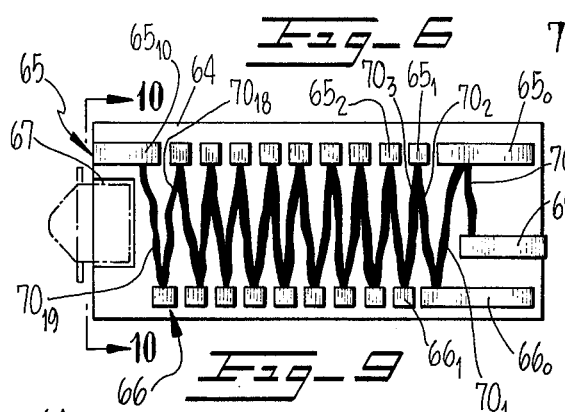
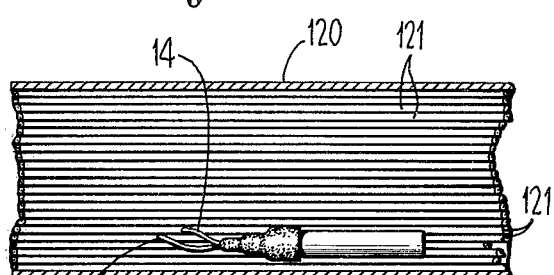
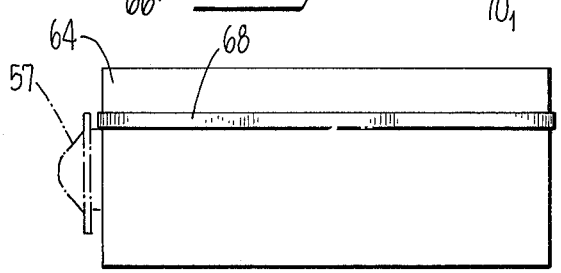
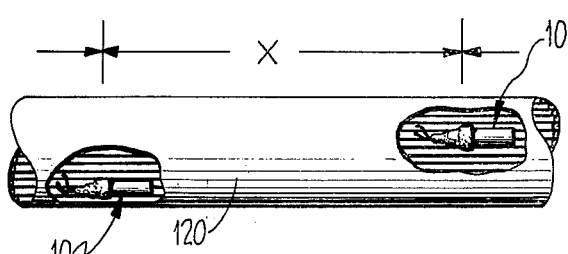
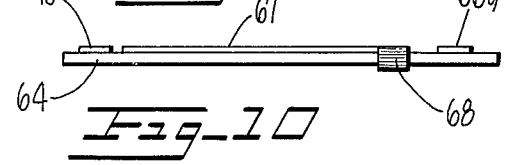

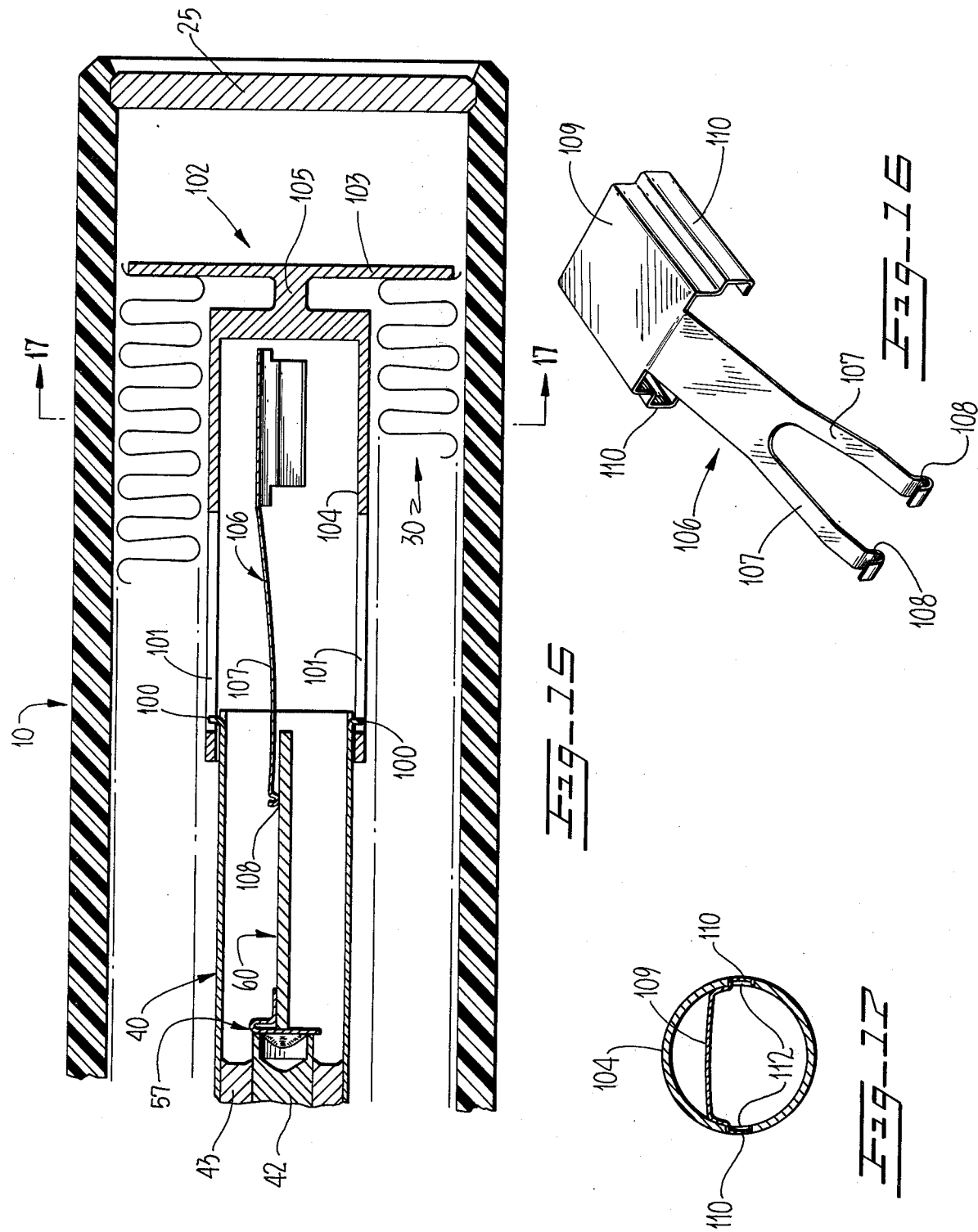

ADJUSTABLE PRESSURE TRANSDUCER WITH DIGITAL SIGNAL OUTPUT

BACKGROUND OF THE INVENTION

This invention relates to a pressure transducer for generating an electric signal representative of the ambient pressure of the environment in which the transducer is located.

Both analog and digital transducers are known for measuring the ambient pressure of the environment. Such transducers typically employ electro-mechanical circuitry to generate an output signal representative of the fluid pressure adjacent a pressure sensing element, such as a compressible bellows. Such transducers have been used in a wide variety of applications, including fluid pipelines, pressurized multi-conductor sheathed telephone cables, and other applications in which the pressure in a given volume or along a given volume segment of an enclosed conduit is the parameter of interest.

While known devices of the above type have been found to perform in a satisfactory manner in some applications, in many other applications their performance has been found to be impaired by one or more inherent disadvantages. Some prior art transducers, e.g., employ sliding electrical contacts which are exposed to ambient and are thus subject to oxidation or contamination over prolonged periods of use. To counteract the resulting degradation in performance, devices of this type are typically designed with the sliding contacts mounted exterior of the volume of interest. This design increases the overall size and weight of the device which typically results in greater manufacturing costs, and complicates the installation procedure, which likewise increases the overall cost of the device. In applications requiring a large number of transducers, the undesirable cost increases are greatly multiplied.

Further, in many applications it is desirable to integrate a plurality of the pressure transducers into a computerized testing system in which the individual transducers are monitored from a remote location. Many conventional transducers provide analog output signals which are not conventional readily adaptable to such a monitoring program. Even those known transducers which do provide output signals of the digital variety, however, are frequently difficult to interface with an associated computer system since the output voltages representing the various increments in pressure extend over a range which cannot be easily accommodated in a conventional computerized signal input system.

Still other known devices are extremely cumbersome and bulky and thus cannot be readily incorporated into an environment where space is at a premium.

SUMMARY OF THE INVENTION

The invention comprises a pressure transducer for measuring ambient pressure over a relatively wide range simple in design, which is compact and rugged in construction, and extremely simple to install.

In the preferred embodiment, a housing having one or more apertures for admitting ambient pressure to the interior thereof surrounds a pressure responsive electrically conductive bellows enclosing a digital signal generator. The digital signal generator includes a translatable electrical contact element secured to the working end of the bellows and a stationary multi-resistor assembly comprising a staggered pair of rows of spaced contact pads and miniature resistors coupled between selected pads in opposite rows to provide a series resistance network whose resistance depends on the position of the contact element. The multi-resistor assembly is received in a mounting enclosure secured to the first end of an electrically conductive support rod which is adjustably secured within the housing by an adjustment means and an electrically conductive mounting member. A second bellows having an outer diameter smaller than the inner diameter of the first bellows is sealingly secured to the mounting member at one end and to the multi-resistor mounting enclosure at the other end, with the annular volume between the pair of bellows partially filled with a relatively inert gas at extremely low pressure to provide a non-corrosive contaminant free atmosphere for the digital signal generator components. A pair of electrical conductors are coupled to the support rod and mounting member so that the resistance of the multi-resistance assembly can be measured by external equipment.

In operation, a change in ambient pressure causes movement of the bellows which translates the contact element along the surface of the multi-resistor assembly. With a reference voltage applied to the input conductors, the motion of the contact element along the staggered contact pads is detected by discrete changes in the resistance of the multi-resistor assembly. By calibration these resistance changes to pressure, the value of the ambient pressure can be readily determined. In the preferred embodiment, the values of the different resistances are chosen to provide a stepped logarithmic response over the range of pressures of interest.

In an assembled device, the zero or low pressure position of the multi-resistor element can be externally adjusted by means of the adjustment means which is rotatably secured to the mounting member, the adjustment means being threadably engaged with an externally threaded portion of the support rod and secured against axial movement by a small retainer clip. Rotation of the adjustment means causes the rod and mounting enclosure to be translated in the desired direction, thereby adjusting the position of the multi-resistor element in the housing relative to the contact element. In this manner, the transducer can be adjusted to operate over the predetermined pressure range between different absolute end point pressures.

In one application, a plurality of transducers are inserted in a sheathed telephone cable and coupled to different pairs of subscriber conductors at predetermined spaced intervals. By sampling the different pairs of conductors with a reference voltage of a predetermined magnitude and noting the voltage reading obtained, a pressure profile of the entire cable or portions of the cable of interest can be readily obtained and pressure anomalies can be pinpointed from a remote location.

For a fuller understanding of the nature and advantages of the invention, reference should be had to the ensuing detailed description taken in conjunction with the accompanying drawings.

BRIEF DESCRIPTION OF THE DRAWINGS

FIG. 4 is an end elevational view of the adjusting nut;

FIG. 6 is an enlarged partial sectional view illustrating a detail of the preferred embodiment of FIG. 2;

FIGS. 7 and 8 are views taken along lines 7—7 and 8—8 of FIG. 6, respectively;

FIG. 9 is a top plan view of the multi-resistor chip assembly;

FIG. 10 is an end view taken along lines 10—10 of FIG. 9;

FIG. 11 is a bottom plan view of the multi-resistor chip assembly of FIG. 9;

FIG. 12 is a circuit diagram of the resistance network embodied in the assembly of FIG. 9;

FIG. 13 is a perspective view of the contact element of the FIG. 2 embodiment;

FIG. 15 is a partial sectional view similar to FIG. 2 illustrating an alternate embodiment of the invention;

FIG. 16 is a perspective view of the contact element in the embodiment of FIG. 15;

FIG. 17 is a sectional view taken along lines 17—17 of FIG. 15;

FIG. 18 is a sectional view illustrating an application of the invention;

FIG. 19 is a partial sectional view showing a plurality of installed transducers in the FIG. 18 application; and FIG. 20 illustrates an alternate embodiment of the transducer housing.

DESCRIPTION OF THE PREFERRED EMBODIMENTS

Figure 1:
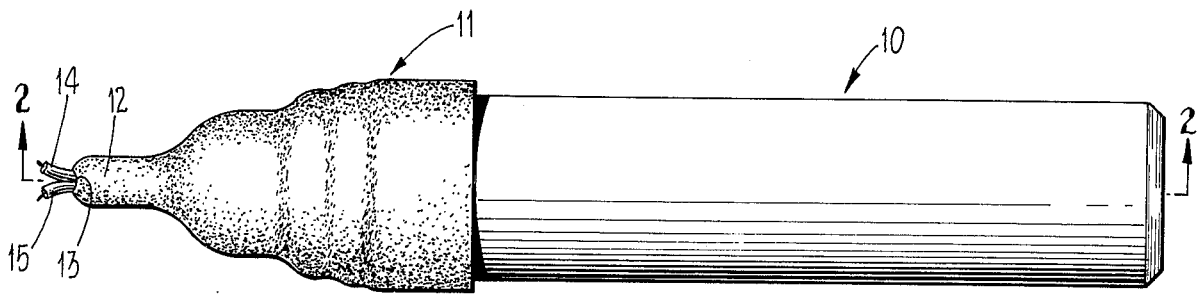
FIG. 1 is a side elevational view of the invention.

Turning now to the drawings, FIG. 1 shows a side elevational view of a preferred embodiment of the invention which includes a housing 10 fabricated from an electrical insulator material and a flexible cover or boot 11 for enclosing one end of housing 10. The tip 12 of boot 11 is provided with a small aperture 13 to enable a pair of sheathed electrical conductors 14, 15 to be coupled to the elements within housing 10 in the manner described below.

Figure 2:
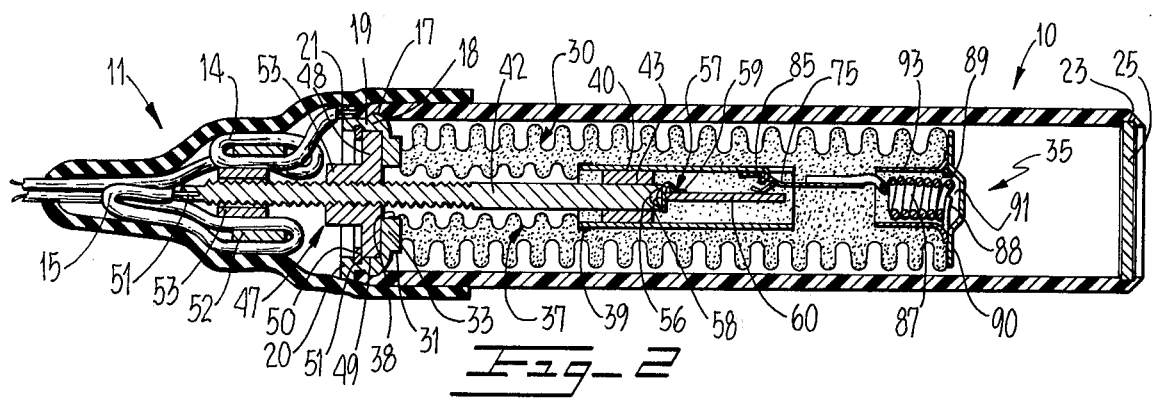
FIG. 2 is a sectional view taken along lines 2—2 of FIG. 1.

FIG. 2 shows a sectional view of the FIG. 1 embodiment. As seen in this FIG., housing 10 comprises a substantially cylindrical member having a first inner peripheral notch 17 for receiving a shoulder portion 18 of an end member 19. End member 19 is preferably fabricated from a suitable electrically conductive material such as brass and is provided with a peripheral flange portion 20 having an aperture 21 to which the tip of conductor 14 is secured to provide good electrical contact therewith.

Housing 10 is provided with a second inner peripheral notch 23 in which a closure disc 25 is received. Closure disc 25 functions as a sediment filter to prevent large contaminant particles from entering the bore of housing 10 while permitting ambient pressure to be freely communicated thereto, and is fabricated from porous stainless steel having an average pore size of about 25 microns, polyvinyl flouride 2 (PVF2), or other equivalent porous material.

Located within housing 10 is a first outer bellows 30, preferably fabricated from brass, stainless steel, monel, nickel or equivalent materials, and having a first axially extending annular flange 31 which is sealingly secured by any suitable means, e.g. brazing or soldering, to the outer cylindrical surface of an inwardly projecting boss 33 of end member 19. The remaining end of bellows 30 is sealingly secured to a brush cap assembly 35, described below, preferably by soldering.

A second inner bellows 37 is located within outer bellows 30. Inner bellows 37 has a first axially extending annular flange portion 38 sealingly secured to the inner cylindrical surface of boss 33 by soldering or brazing. The other end of inner bellows 37 is also provided with an annular flange 39 extending in the opposite direction from flange 33 and sealingly secured to a first end of a tube 40. As will now be apparent, the shaded volume between outer bellows 30, inner bellows 37 and brush cap assembly 35 comprises a sealed chamber. As described more fully below, this sealed chamber is provided during assembly a small quantity of helium or an equivalent inert gas at extremely low pressure, e.g. about 10 microns.

Figures 4, 6, 7:
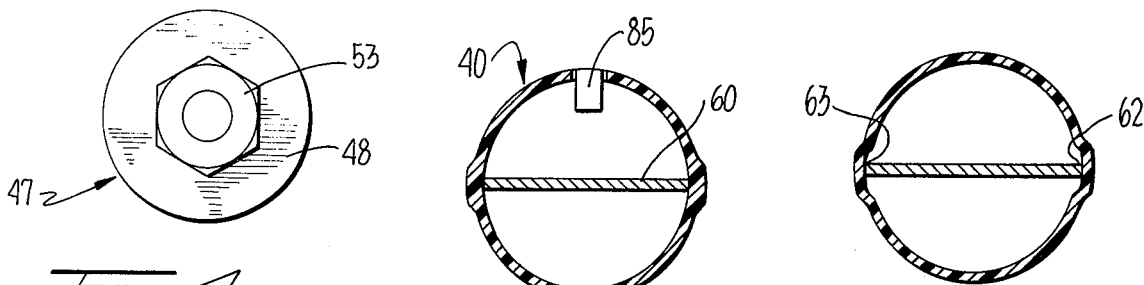

Tube 40 is secured to the inner end of an axially adjustable mounting rod 42 by means of an annular glass spacer 43 which is fused at the other and inner surfaces thereof to the inner surface of tube 40 and the other surface of rod 42, respectively. Rod 42 is preferably constructed from Kovar, or other equivalent material having good electrical conductivity and non-corrosive properties and is provided with an externally threaded portion 45 which is threadably engaged with an adjustment nut 47. Adjustment nut 47 has a cylindrical flange portion 48 which is rotatably received in a open bore 49 in end member 19 and restrained against axial movement by the bottom of bore 49 and a conventional retaining clip 50 received in a groove 51 in the wall of bore 49. As best shown in FIG. 4, adjustment nut 47 is provided with a hex shaped boss 53 to facilitate rotation thereof for the purpose described below.

The outer end of rod 42 is provided with a blind bore 51 in which the end of conductor 15 is secured, e.g. by soldering, to provide a good electrical connection therewith.

Sheathed conductors 14, 15 are looped about an annular packing member 52 and a second annular packing member 53 is wedged between conductors 14, 15 and the outer surface of the tip of rod 42 to protect the soldered connections from strain when portions of conductors 14, 15 external to the boot 11 are subjected to stress.

Figures 3, 5:
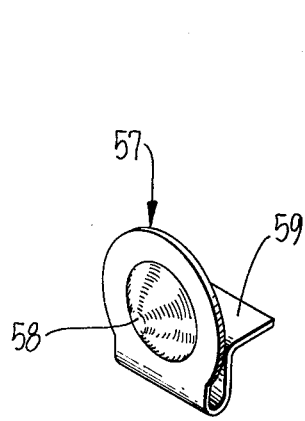
FIG. 3 is an end elevational view of the enclosure disc.
FIG. 5 is a perspective view of the retainer clip.

The inner end of rod 42 is provided with a blind bore 56 in which a domed portion 58 of a conductive retainer clip 57, shown in FIG. 5, is frictionally received. Clip 57 has an integral mounting tab 59 secured to a first end of a multi-resistor chip assembly 60 by any suitable means, such as soldering. With reference to FIGS. 7 and 8, chip assembly 60, is held in tube 40 by means of a pair of swaged mounting channels 62, 63, which are sized to snugly accommodate the side walls of the assembly 60.

With reference to FIGS. 9–11, resistor chip assembly 60 includes an insulative substrate 64 having a pair of rows 65, 66 of individual electrically conductive pads deposited on the top surface thereof, an electrically conductive end pad 67 which is electrically connected to clip flange 58 (shown in phantom) when the clip is installed, an electrically conductive strip 68 connected to end pad 67 and running along the bottom side of substrate 64 (FIGS. 10, 11) and terminating in an end 69 at the other end of the top surface of substrate 64. Electrically connected between individual pads $65_i$, $66_i$ are a plurality of resistive elements $70_i$, which in the preferred embodiment are formed from resistive ink coated on the top surface of substrate 64 and later trimmed to provide the resistance values specified below. An additional resistive element $70_0$ is connected between end pad $65_0$ and terminal portion 69 of strip 68. FIG. 12 shows the electrical resistance network provided by elements $65_i$, $66_i$, and $70_i$. As seen in this FIG., resistance $70_0$ is an input resistor always present in the circuit, to which a reference voltage is applied via terminal 69 in the manner described below. The remaining resistances $70_1$–$70_{19}$ are arranged in a serial array so that they are inserted in series with previously inserted resistances as the terminal pads $65_i$, $66_i$ are sampled sequentially in ascending order of magnitude in the manner described below. In the interest of clarity, several terminal pads $65_i$, $66_i$ and resistances $70_i$ are omitted from the FIG. 12 circuit diagram.

In the preferred embodiment, the respective values of resistances $70_0$–$70_{19}$ are as follows:

| Resistance Element | Resistance Value |
|---|---|
| $70_0$ | 100 (kilohms) |
| $70_1$ | 110 |
| $70_2$ | 122 |
| $70_3$ | 135 |
| $70_4$ | 150 |
| $70_5$ | 166 |
| $70_6$ | 186 |
| $70_7$ | 208 |
| $70_8$ | 232 |
| $70_9$ | 265 |
| $70_{10}$ | 301 |
| $70_{11}$ | 344 |
| $70_{12}$ | 400 |
| $70_{13}$ | 468 |
| $70_{14}$ | 568 |
| $70_{15}$ | 698 |
| $70_{16}$ | 898 |
| $70_{17}$ | 1,200 |
| $70_{18}$ | 1,820 |
| $70_{19}$ | 3,820 |

The above selected values for resistances $70_0$–$70_{19}$ provide an incremental logarithmic response scale over a 10 p.s.i. range of pressures, with each incremental step corresponding to a change in pressure of 0.5 p.s.i. As noted below, the invention may be adjusted to operate over the 10 p.s.i. range between end points representing different absolute pressures.

With reference to FIGS. 2, 9, and 13, contact pads $65_i$ and $66_i$ are mounted for cooperative relationship with a translatable contact member 75 motivated by end cap assembly 35. As best shown in FIG. 13, contact element 75 is an integral member having a main body portion 76 and a pair of laterally spaced arms 77, having a lead portion 78 formed downwardly below the plane of main body portion 76 and terminating in an upwardly extending tip 79 to form an intermediate contact nib 80. Nib 80 must have a sufficiently sharp angle so as not to bridge the gap between adjacent conductor pads on chip assembly 60. In the preferred embodiment the angle between tip portion 79 and the lead portion 78 of each arm 77 is about 60°. Contact element 76 also has an integral upstanding central member 81 formed at an upwardly angle out of the plane of main body portion 76 terminating in a chambered tip portion 82 and having an aperture 83 for accommodating a tang 85 formed in the end of tube 40 to provide a low pressure limit stop.

The main body portion 76 of contact element 75 is secured to the free end of a helical spring 87 which is secured at the other end to a retainer plate 88. The secured end of spring 87 is received in an aperture 89 in retainer plate 88 and secured thereto by soldering to maintain the proper alignment for contact element 75. Retainer plate 88 is secured to an end plate 90 having a dished recess 91 for accommodating the secured end of spring 87. A tubular section 93 is secured to the inner surface of end plate 90 to provide a high pressure limit stop.

The apparatus is assembled in the following manner. Tube 40 is first secured to the inner end of rod 42 by means of a glass seal 43. Flange 39 is next soldered to tube 40. Next, resistor chip assembly 60 is installed in tube 40 with the edges of substrate 64 engaged in channels 62, 63 and domed portion 58 of clip 57 in firm contact with inner end bore 56 of rod 42. Contact element 75 is then inserted into the mouth of tube 40 until tang 85 is received in aperture 83. The rod-tube-end cap assembly is then installed into the interior of outer bellows 30 and this sub-assembly is maneuvered relative to end member 19 until flange 38 of small bellows 37 is received by the inner surface of boss 33 and flange 31 of large bellows 30 is received on the outer surface of boss 33. Next, these two flanges 31, 38 are soldered to the boss 33 of end member 19. Adjustment nut 47 is then threaded onto rod 42 and secured in place in bore 49 of end member 19 with retainer clip 50.

The bellows end member sub-assembly is next inserted into a vacuum chamber which is then sealed and evacuated to substantially zero pressure, subsequently partially vented with helium and then pumped down to about 10 microns absolute pressure. Next, end cap assembly 35 is soldered to large 30 in order to seal the enclosed volume. During this portion of the assembly process, tang 85 prevents contact element 75 from withdrawing completely from tube 40.

After sealing, the vacuum chamber is vented to ambient and the now-sealed sub-assembly is cooled. After cooling, the sealed sub-assembly is inserted into housing 10 until end cap 19 is secured in annular groove 17. Sheathed conductors 14, 15 are next soldered to their respective mouting points and wrapped about packing member 52. Packing member 53 is then wedged between the looped portions of sheathed conductors 14, 15 and the tip of rod 42. Conductors 14, 15 are then fed through aperture 13 in the tip of boot 11, after which boot 11 is installed over the boot end of housing 10.

The fully assembled pressure transducer functions to measure the ambient pressure in the following manner. Ambient pressure exterior of housing 10 is communicated via porous closure disc 25 to the free end of outer bellows 30, viz. end cap assembly 35. As the pressure changes, end cap assembly 35 is translated axially along housing 10, the direction of movement depending on whether the pressure increases or decreases. The limit stops provided by tang 85 and the end face of tubular section 93 protect contact element 75 from damage or complete withdrawal from tube 40. As end cap 35 is thus translated axially, contact element 75 follows this motion and contact nibs 80 progress along paths 65, 66 to sequentially contact pads $65_i$, $66_i$. Since the contact pads in the two rows are staggered, once the contact nibs 80 leave the end pads $65_0$, $66_0$, only one contact pad in rows 65, 66 is contacted at any given position.

Thus, as contact element 75 moves axially, resistances are inserted or removed from the circuit loop between terminal 69 and the common electrical return path comprising end cap assembly 35, outer bellows 30, end member 19, and return conductor 14. By placing a reference voltage across conductors 14, 15 this change in resistance can be measured and, since the values of resistances $70_i$ are known, correlated to a pressure reading.

Figure 14:
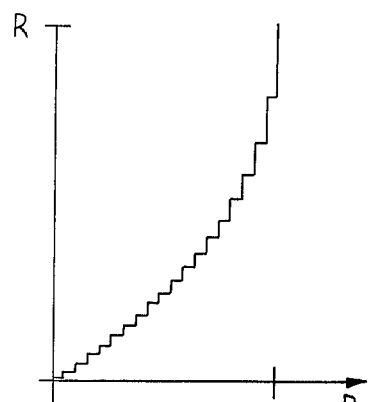
FIG. 14 is a plot of resistance versus pressure showing the electrical response of the invention to a change in pressure.

FIG. 14 shows a plot of resistance versus pressure obtained with the invention with the resistance values noted above. In FIG. 14, resistance is plotted along the ordinate while pressure in pounds per square inch is plotted along the abscissa. As will be evident to those skilled in the art, the variation of resistance with pressure provided by the preferred embodiment is a logarithmic plot in discrete steps. This logarithmic response is highly compatible with conventional computer testing systems and is accordingly preferred when the invention is employed with such systems. However, the variation of resistance with pressure may be tailored to any given application by selecting different values for resistances $70_i$ when designing the resistor chip assembly 60.

As will now be apparent, the invention permits the measurement of pressure changes in discrete steps over a predetermined pressure range. In the preferred embodiment, the measurement range is 10 p.s.i. at 0.5 p.s.i. intervals. The extent of the measurement range, and the measurement interval may be modified by changing the number of resistance elements $70_i$ and the number and interstitial spacing of contact pads $65_i$, $66_i$.

In addition, the invention may be adjusted to operate with different absolute pressures in the following manner. The pressure transducer is first exposed to the minimum ambient pressure desired to be measured. Adjusting nut 47 is then rotated to translate rod 42, tube 40 and resistor chip assembly 70 until contact nibs 80 of contact element 75 rest on contact pads $65_0$, $66_0$. During rotation of adjusting nut 47, a test voltage is applied across leads 14, 15 in order to observe the resistance of resistor chip assembly 60 during adjustment. When the maximum resistance reading is obtained, the proper zero setting is established.

FIGS. 15–17 illustrate an alternate embodiment of the invention having a modified end cap, contact element and tube. In this embodiment, tube 40 is provided with a pair of outwardly formed tangs 100 at the open end thereof which are received in a first pair of opposing slots 101 in an integral end cap 102. End cap 102 has a substantially circular end portion 103 joined to a substantially cylindrical cup 104 in which slots 101 are provided, the two elements being joined by an interconnecting portion 105. Contact element 106 has a pair of downwardly depending arms 107 at the end of each of which a contact nib 108 is formed, and a main body portion 109 having a pair of oppositely disposed longitudinally extending shoulders 110 which are snap fitted into a pair of oppositely disposed slots 112 in cup portion 104.

Tangs 100 provide limit stops for limiting the axial travel of cup 102 and contact element 106 in both the inner and outer directions in order to prevent contact element 106 from being damaged or withdrawn from tube 40.

As noted above, the preferred embodiment may be employed in a wide variety of applications. FIGS. 18 and 19 illustrate one such application of the device for monitoring the fluid pressure in a sheathed multiconductor telephone feed cable. As shown in FIG. 18, a conventional sheathed telephone multi-conductor feed cable has an outer sheath 120 typically fabricated from lead or the like providing a sealed cylindrical volume in which a multiplicity of pairs of subscriber conductors 121 are enclosed. Each pair of conductors 121 corresponds to a unique subscribed location which is individually addressable from a remote site, e.g. the central telephone exchange. A pressure transducer constructed according to the invention is placed within sheath 120 and leads 14, 15 thereof are coupled to a specific pair 121 of subscriber conductors. As will be appreciated by those skilled in the art, installation may be readily accomplished by merely slitting sheath 120, exposing the conductors in the conductor pair and soldering the ends of conductors 14, 15 thereto. After installation, the entrance slit is re-sealed in any convenient manner and the specific location of the installed transducer along the length of cable 120 is indexed to the tapped conductor pair at that location. As shown in FIG. 19, individual transducers are installed at regular intervals X along cable 120 and their individual locations indexed by noting the subscriber pair to which each of the individual transducers is coupled together with the positional location.

Once installed, the pressure at any point along the cable may be readily sampled from a remote location by merely applying a sampling voltage to the proper conductor pair and noting the resistance reading obtained. This may be accomplished either manually or automatically by means of a properly programmed digital computer. Further, a pressure profile along a given length of cable 120 or along the entire length of cable 120 may be similarly obtained by sequentially sampling the resistance of the various pairs of subscriber cables on a regular basis. In this manner, a pressure drop in the feed cable caused by a break in the sheathing 120 can be immediately pinpointed. Thus, ruptures in the cable may be quickly located and scheduled for repair.

As will now be apparent, pressure transducers constructed in accordance with the invention provide a number of advantages over known devices. The sealed construction of the double bellows sub-assembly, for example, prevents any contamination or corrosion of the sliding contact elements thereby insuring reliable resistance readings over a prolonged period of time regardless of the nature of the environment. Further, the adjustability feature permits the transducer to be used in a wide variety of environments from extremely low to extremely high pressures without sacrifice in performance. In addition, the digital output renders the device fully compatible with a wide range of measuring systems, including existing computer sampling systems. Lastly, the simple design and rugged construction, permits the device to be used in a wide variety of applications and in extremely severe environments.

While the above provides a full and complete disclosure of the preferred embodiment of the invention, various modifications, alternate constructions and equivalents may be employed without departing from the spirit and scope of the invention. For example, as shown in FIG. 20, housing 10 may be constructed as an integral unit of a suitable porous material such as PVF2 and end disc 25 may thus be eliminated. Further, in applications wherein the problem of large particle contamination is not present, housing 10 may comprise a solid housing of a non-porous material provided with apertures at suitable locations therealong. Therefore, the above description and illustrations should not be construed as limiting the scope of the invention, which is defined by the appended claims.

What is claimed is:

1. A pressure transducer assembly for indicating ambient pressure over a predetermined differential pressure range having a minimum and a maximum and operable over a wide range of absolute pressures, said assembly comprising:

a housing having an interior;

means for communicating ambient pressure to said interior; and means supported in said housing interior for generating discrete signals over said differential pressure range each representative of a different value of said ambient pressure, said generating means including means defining a protective enclosure for preventing contamination thereof;

said generating means including a multi-resistor assembly and a contact element, one of said multi-resistor assembly and said contact element being translatable relative to the other in response to changes in said ambient pressure;

said multi-resistor assembly including an insulated substrate, a pair of spaced parallel rows of electrically conductive contact pads, the contact pads of one row being staggered relative to the contact pads in the other row, and a plurality of resistive elements connected to contact pads in said pair of rows to provide a series resistance network;

said contact element having a pair of spaced contact arms, each said arm being arranged for contact with individual pads of a different row.

2. The apparatus of claim 1 wherein said communicating means comprises a porous member carried by said housing.

3. The apparatus of claim 2 wherein said porous member is integral with said housing.

4. The apparatus of claim 1 wherein said multi-resistor assembly is stationary and said contact member is translatable.

5. The apparatus of claim 1 wherein said resistive elements are arranged to provide a logarithmic resistance scale.

6. The apparatus of claim 1 wherein said protective enclosure includes an outer bellows member having a first end secured to said housing and a second end translatably received in said housing interior, said contact element being secured to said second end.

7. The apparatus of claim 1 further including means for adjusting the absolute value of the minimum and maximum of said differential pressure range.

8. The apparatus of claim 1 further including means for varying the relative position of said multi-resistor assembly and said contact element to establish the absolute value of the minimum and maximum of said differential pressure range.

9. The apparatus of claim 8 wherein said multi-resistor assembly is carried by a rod and wherein said adjusting means includes means for translating said rod along the axis of said housing.

10. A system for measuring ambient pressure at spaced locations along an enclosed volume of interest, said system comprising:

a longitudinally extending enclosure defining said volume;

a plurality of pairs of electrical conductors extending along said volume; and a plurality of pressure transducers each positioned along said volume at different predetermined spaced locations, each said pressure transducer having a pair of electrical signal leads coupled to a different one of said plurality of pairs of electrical conductors;

each said pressure transducer comprising a housing having an interior; means for communicating ambient pressure to said interior; and means coupled to said pair of electrical signal leads for generating discrete signals on said electrical signal leads over said differential pressure range, each representative of a different value of said ambient pressure, said generating means including means defining a protective enclosure for preventing contamination thereof;

said generating means including a multi-resistor assembly and a contact element, one of said multi-resistor assembly and said contact element being translatable relative to the other in response to changes in said ambient prdssure;

said multi-resistor assembly including an insulated substrate, a pair of spaced parallel rows of electrically conductive contact pads, the contact pads of one row being staggered relative to the contact pads in the other row, and a plurality of resistive elements connected to contact pads in said pair of rows to provide a series resistance network, said pads and said resistive elements being supported on said substrate;

said contact element having a pair of spaced contact arms, each said arm being arranged for contact with individual pads of a different row.

11. The apparatus of claim 10 wherein said multi-resistor assembly is stationary and said contact member is translatable.

12. The system of claim 10 wherein said resistive elements are arranged to provide a logarithmic resistance scale.

13. The system of claim 10 wherein said protective enclosure includes an outer bellows member having a first end secured to said housing and a second end translatably received in said housing interior, said contact element being secured to said second end.

14. The system of claim 10 wherein each said pressure transducer includes means for adjusting the absolute value of the minimum and maximum of said differential pressure range.

15. The system of claim 10 wherein each said pressure transducer includes means for varying the relative position of said multi-resistor assembly and said contact element to establish the absolute value of the minimum and maximum of said differential pressure range.

16. The system of claim 15 wherein said multi-resistor assembly is carried by a rod and wherein said adjusting means includes means for translating said rod along the axis of said housing.

17. The system of claim 10 wherein said longitudinally extending enclosure comprises a telephone feed cable and said plurality of pairs of electrical conductors comprise individual subscriber conductors.

* * * * *